No. 819,510. PATENTED MAY 1, 1906.
C. W. BRIDGES.
CHEESE CUTTER.
APPLICATION FILED NOV. 28, 1904.
2 SHEETS—SHEET 1.
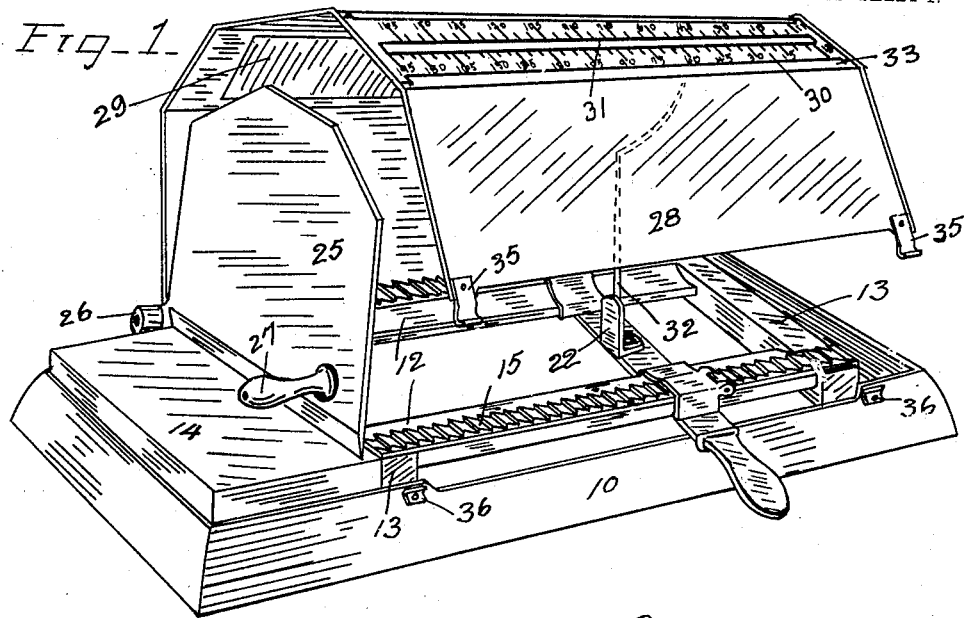
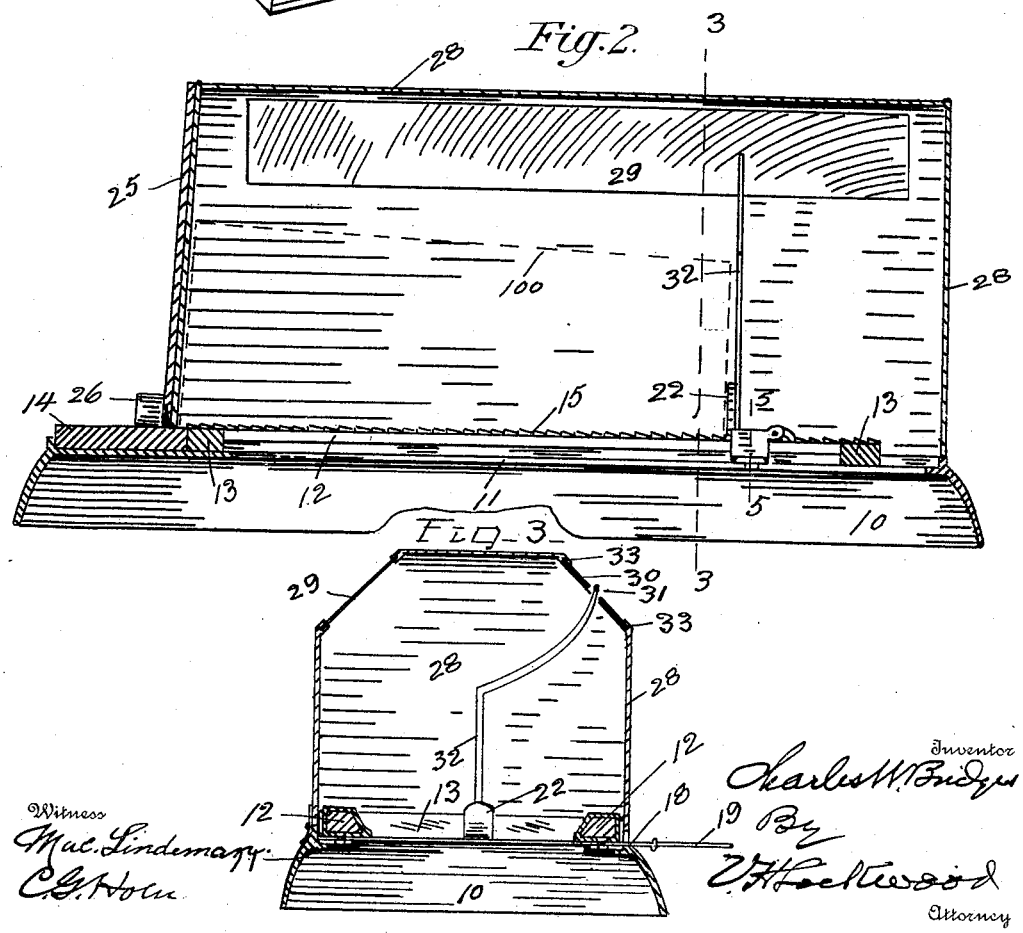

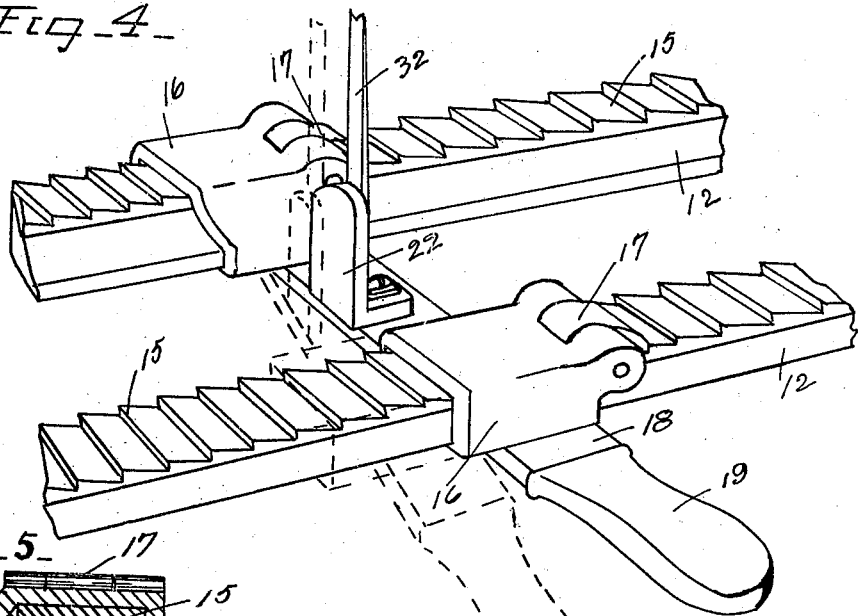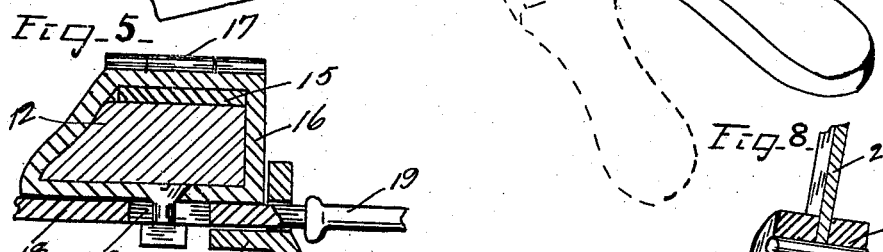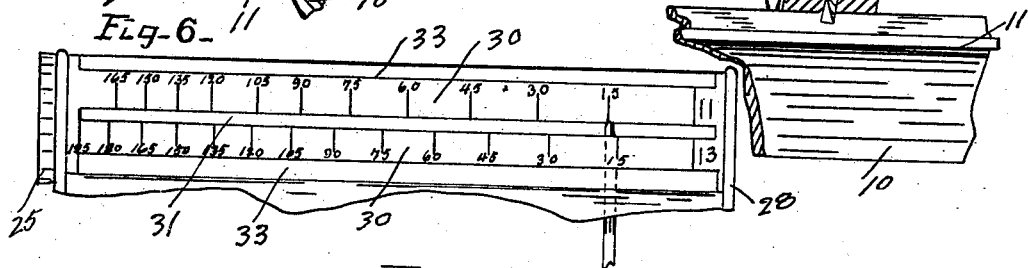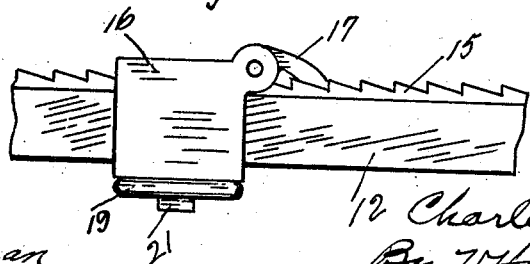

UNITED STATES PATENT OFFICE.

CHARLES W. BRIDGES, OF INDIANAPOLIS, INDIANA.

CHEESE-CUTTER.

No. 819,510. Specification of Letters Patent. Patented May 1, 1906.

Application filed November 28, 1904. Serial No. 234,652.

*To all whom it may concern:*

Be it known that I, CHARLES W. BRIDGES, of Indianapolis, county of Marion, and State of Indiana, have invented a certain new and useful Cheese-Cutter; and I do hereby declare that the following is a full, clear, and exact description thereof, reference being had to the accompanying drawings, in which like numerals refer to like parts.

The object of this invention is to provide an improved cheese-cutter device for tapering cheeses, usually called "long-horn" cheese. Such cheeses are in the form of a frustum of a cone, although there is a very slight degree of tapering.

One feature of the invention consists in a cheese-support movable on the base toward and away from the knife and suitably guided by the base, so that if the cheese had been fed forward too far or a mistake made the cheese may be moved backward readily for refeeding.

Another feature of the invention consists in the combination, with a scale arranged longitudinally of the device, of an indicator connected with the means for feeding the cheese to the knife, so that it will indicate directly and by such simple construction the extent of movement of the cheese in order to obtain a slice of a certain size or value.

Another feature consists in the peculiar means for feeding the cheese to the knife.

Another feature of the invention consists in the combination, with a horizontal cheese-support, of a knife inclined with reference to the cheese-support, so that it will cut a tapering cheese lying on said horizontal cheese-support diametrically.

These and the other features of my invention will be understood from the accompanying drawings and the following description and claims.

In the drawings, Figure 1 is a perspective view of a cheese-cutter with the cover elevated somewhat and the corner of the base broken away. Fig. 2 is a central vertical longitudinal section with the outline of cheese in dotted lines of the device. Fig. 3 is a transverse section on the line 3 3 of Fig. 2. Fig. 4 is a perspective view of the cheese-feeding mechanism, parts being broken away and an altered position of the parts being shown in dotted lines. Fig. 5 is a vertical transverse section of a part of what is shown in Fig. 4 on the line 5 5, parts being broken away. Fig. 6 is a plan view of a portion of the cover, showing the scale and the upper part of the indicator, parts being broken away. Fig. 7 is a side elevation of a portion of what is shown in Fig. 4. Fig. 8 is a detail of the pivot construction for the knife.

In detail, the device shown in the drawings herein consists of a base 10, provided on each side with a guideway for the cheese-support formed of longitudinal ledges or strips 11. The cheese-support is a frame consisting of two side bars 12 and two end cross-bars 13, secured under and to said side bars. This frame is shorter than the guideway of the base on which it rests and is longitudinally movable to some extent. At the knife end such longitudinal movement of the cheese-support is limited and stopped by the slice-board 14, so that as the cheese is fed forward on said cheese-support the cheese-support will have no movement, but, if desired, the cheese-support and cheese thereon may readily be moved backward somewhat, as is clear in Fig. 2.

The side bars of the cheese-support have a concave surface on their inner edges, so as to receive and fit the concave surface of the cheese 100. On the top surface of said side bars of the cheese-support there is secured a rack 15, fitting longitudinally with the teeth facing the knife. A metal slide 16 loosely surrounds each side bar, as shown in Figs. 4 and 5, and rides loosely upon the rack-bar. It has a gravity-pawl 17, hinged to its rear edge, that engages the teeth of the rack-bar. A handle-bar 18 is at one end provided with a handle 19 and at its other end is pivoted to the farther of said slides 16. Under the other of said slides 16 said handle-bar 18 has a longitudinal slot 20, through which a pin 21 from the slide extends loosely, as seen in Fig. 5. The handle-bar 18 extends transversely of the cheese-support, and centrally secured to said handle-bar 18 there is a follower 22, that pushes the cheese toward the knife as the handle-bar is operated. It is pivotally mounted on the handle-bar, so that it will not rock when the handle-bar is being operated, and therefore will not injure the cheese. From this it is seen that the reciprocation of the handle 19 will cause the cheese to be moved up one or more notches at a time, as desired. When the handle 19 is pushed rearward, the farther slide is moved up on the rack-bar, and when the handle-bar 19 is moved forward the nearer slide is moved on its rack-bar, and rapid reciprocation of the handle 19 will cause rather rapid feeding of the cheese.

A knife 25 is pivoted to one side of the frame-pin 26 and has on it a handle 27. Said pivot is mounted at a slight inclination to the cheese-support and frame of the machine, so that the knife will be inclined somewhat at an angle other than a right angle to the cheese-support, as shears, the upper part of the knife leaning inward somewhat. This inclination of the knife is such as to make it conform to the end of the tapering cheese placed on the cheese-support, so as to cut said cheese diametrically into slices.

A cover 28 is pivotally connected along one longitudinal edge to the base and extends longitudinally of the device and is closed at the rear end, but open at the end adjacent the knife, so that when the lid is closed the knife will close the open end thereof. Said cover on one side has a glass window 29.

A scale 30 is provided longitudinally of the device, and, as here shown, said scale is placed upon the cover, and the cover is longitudinally slotted at 31, so that the indicator 32 from the cheese follower or feeding mechanism may extend through it. Said indicator is secured herein to the cheese-follower 22 and extends through said slot when the lid is closed. The scale here is placed on a strip of paper that slips in between guiding-strips 33, secured to the cover.

The scales here shown are one for an eleven-pound cheese and the other for a thirteen-pound cheese. Said scales are price-scales and show the extent to which the feeding mechanism shall be moved in order that a slice of certain value shall be cut therefrom. However, I do not wish to limit myself to price-scales, as weight and portion scales may be also used in this arrangement; nor do I wish to limit the construction to only two scales, as several scales may be used for cheeses of varying weights.

Latches 35 on the cover engage catches 36 on the base and hold the cover closed.

In operation after the cheese has been placed on the support and the cover closed the handle 19 is operated after throwing back the knife to the extent required to cut off a slice of the value wanted. The operator need not see the cheese in order to determine this, as the indicator and scale are directly in front of him, and he adjusts the position of the cheese in accordance with them. He then operates the knife. If the purchaser should change his mind before the slice is cut or a mistake had been made, the whole cheese-support may be moved rearward by the handle 19 being pushed rearward without the operating movement of the slides on the rack-bars, the knife put down, the cheese pushed up against the knife, and then the operation of the feeding of the cheese to the desired extent is repeated. With this arrangement, therefore, one can move the cheese directly so as to cut off a portion of any value, and the particular feeding mechanism shown is not necessary to accomplish this result. Any means for moving the cheese may be adopted, the indicator and the scale always showing the value or weight or extent of the portion which the knife will cut off when operated; nor do I wish to limit the feeding mechanism or the scale and indicating mechanism to a device containing an inclined knife, as the same may be also used without modification in a structure having a knife operating at an exact right angle to the cheese-support.

What I claim as my invention, and desire to secure by Letters Patent, is—

1. In a cheese-cutter, a knife, a cheese-support movable toward and away from the knife, and means for moving the cheese on said cheese-support toward the knife.

2. In a cheese-cutter, a knife, a base provided with a longitudinal guideway, and a cheese-support movable longitudinally in said guideway toward and away from said knife.

3. In a cheese-cutter, a base with a longitudinal guideway, a cheese-support longitudinally movable in said guideway, a slice-board at one end of said guideway that stops the movement of the cheese-support, and a knife mounted over said slice-board.

4. In a cheese-cutter, a knife, a base provided with a longitudinal guideway, a cheese-support movable in said guideway toward and away from said knife, and means for moving said cheese-support.

5. In a cheese-cutter, a knife, a cheese-support, movable toward and away from the knife, and a single means for moving said cheese-support and also feeding said cheese thereon toward the knife.

6. In a cheese-cutter, a knife, a cheese-support, a handle-bar movably mounted on said cheese-support at the rear of the cheese with a handle thereon for operating said handle-bar, and a follower on the handle-bar for pushing the cheese as the handle-bar is operated.

7. In a cheese-cutter, a knife, a cheese-support, a rack-bar at each side of said cheese-support, a slide mounted on each rack-bar, a pawl on each slide that engages the rack-bars, a handle-bar pivoted to said slides for operating the same, and a follower on said handle-bar to push the cheese substantially as set forth.

8. In a cheese-cutter, a knife, a cheese-support, a rack-bar at each side of said cheese-support, a slide mounted on each rack-bar, a pawl on each slide that engages the rack-bars, a handle-bar pivoted to said slides for operating the same, and a follower pivotally mounted upon said handle-bar for pressing against and pushing the cheese without any rocking movement when the handle-bar is operated.

9. In a cheese-cutter, a knife, a cheese-support having two side bars, a rack upon each side bar, a slide mounted on each rack, a pawl pivoted to each slide for engaging the teeth of the racks, a handle-lever pivoted to one of said slides and slotted under the other slide, a pin for the last-mentioned slide extending loosely through said slot in the handle-bar, and a follower on said handle-bar for engaging and pushing the cheese when the handle-bar is operated.

10. In a cheese-cutter, the combination with a knife and a follower for pushing the cheese to the knife, of an indicator connected with said follower, and a scale along which said indicator moves as the cheese is fed for indicating the extent of movement of the cheese.

11. In a cheese-cutter, the combination with a knife, means for feeding the cheese to the knife, and a cover, of a scale on the cover, and an indicator connected with the feeding means extending in proximity to said scale for indicating the extent of movement of said cheese.

In witness whereof I have hereunto affixed my signature in the presence of the witnesses herein named.

CHARLES W BRIDGES.

Witnesses:
V. H. LOCKWOOD,
N. ALLEMONG.